(12) United States Patent
Sato et al.

(10) Patent No.: US 6,888,889 B2
(45) Date of Patent: May 3, 2005

(54) IMAGE INFORMATION CONVERSION APPARATUS AND IMAGE INFORMATION CONVERSION METHOD

(75) Inventors: Kazushi Sato, Kanagawa (JP); Kuniaki Takahashi, Kanagawa (JP); Teruhiko Suzuki, Chiba (JP); Yoichi Yagasaki, Tokyo (JP)

(73) Assignee: Sony Corporation (JP)

( * ) Notice: Subject to any disclaimer, the term of this patent is extended or adjusted under 35 U.S.C. 154(b) by 527 days.

(21) Appl. No.: 09/986,435

(22) Filed: Nov. 8, 2001

(65) Prior Publication Data

US 2002/0106024 A1 Aug. 8, 2002

(30) Foreign Application Priority Data

Nov. 10, 2000 (JP) ........................................ 2000-344491

(51) Int. Cl.[7] ................................................ H04B 1/66
(52) U.S. Cl. ................................................ 375/240.12
(58) Field of Search ...................... 375/240.12, 240.02, 375/240.03, 240.13, 240.16, 240.18, 240.21, 240.24, 240.26, 240.29; 382/232, 235, 236, 238, 239, 248, 250; 348/695–700; H04N 7/12; H04B 1/66

(56) References Cited

U.S. PATENT DOCUMENTS 6,587,506 B1 * 7/2003 Noridomi et al. ...... 375/240.12
6,647,061 B1 * 11/2003 Panusopone et al. .. 375/240.12
6,658,157 B1 * 12/2003 Satoh et al. ................ 382/239
2002/0051494 A1 * 5/2002 Yamaguchi et al. ... 375/240.16
2002/0110193 A1 * 8/2002 Yoo et al. .............. 375/240.02
2004/0008774 A1 * 1/2004 Takahashi et al. ..... 375/240.12

OTHER PUBLICATIONS

"Field–to Frame Transcoding with Spatial and Temporal Downsampling" Susie J. Wee, John G. Apostolopoulos, IEEE International Conference on Image Processing, Kobe Japan, Oct. 1999.

* cited by examiner

Primary Examiner—Tung Vo
(74) Attorney, Agent, or Firm—Rader, Fishman & Grauer PLLC; Ronald P. Kananen

(57) ABSTRACT

The system provides an image information conversion apparatus and method by which picture quality deterioration caused by conversion from inputted MPEG2 image compression information into MPEG4 image compression information to be outputted is prevented. When an I picture of an MPEG2 bit stream is to be converted into a P-VOP of an MPEG4 bit stream based on an estimated value of the complexity for each VOP, a scene change detection section detects whether or not the I picture includes a scene change. If a scene change is detected by the scene change detection section, then a GOV structure determination section determines that conversion of the I picture of the MPEG2 bit stream into a P-VOP of an MPEG4 bit stream should not be performed.

24 Claims, 9 Drawing Sheets

IMAGE INFORMATION CONVERSION APPARATUS AND IMAGE INFORMATION CONVERSION METHOD

BACKGROUND OF THE INVENTION

This invention relates to an image information conversion apparatus and an image information conversion method, and more particularly to an image information conversion apparatus and an image information conversion method which are used to receive, through network media such as a satellite broadcast, a cable television broadcast or the Internet or process, on a recording medium such as an optical disk or a magneto-optical disk, image information in the form of a bit stream compressed by orthogonal transform such as discrete cosine transform and motion compensation.

In recent years, an apparatus which complies with a method wherein image information is handled as digital data and the redundancy unique to image information is utilized to compress image information by orthogonal transform such as, for example, discrete cosine transform and motion compensation in order to allow transmission and storage of information with a high efficiency has been popularized in both of information distribution from a broadcasting station or the like and information reception by ordinary households.

Particularly, the MPEG(Moving Picture Experts Group)2 standardized by the MPEG is defined as a general purpose image coding system in the ISO/IEC 13818-2 and covers both of interlaced scan images and progressive scan images as well as standard resolution images and high resolution images. Therefore, it is expected that the MPEG2 be used by wide varieties of applications from professional applications to consumer applications in the future.

Where such an MPEG2 compression system as described above is used, realization of a high compression ratio and a good picture quality can be anticipated by allocating, to interlaced scan images of a standard resolution having, for example, 720×480 pixels, a code amount (hereinafter referred to as bit rate) of 4 to 8 Mbps or by allocating, to interlaced scan images of a high resolution having, for example, 1,920×1,088 pixels, a bit rate of 18 to 22 Mbps.

The MPEG2 is directed to high picture quality coding suitable principally for broadcasting, but is not ready for a coding system of a bit rate lower than, that is, of a compression ratio higher than, that of the MPEG1. However, from popularization of portable terminals, it has been expected that the need for a coding system of a higher compression ratio increases in the future. Therefore, the MPEG4 coding system has been standardized, and the image coding system of the MPEG4 was approved as international standards of the ISO/IEC 14496-2 in December 1998.

In order to process MPEG2 image compression information (hereinafter referred to as MPEG2 bit stream) coded once so as to be suitable for digital broadcasting on a portable terminal or the like, it is demanded to convert the MPEG2 bit stream into MPEG4 image compression information (hereinafter referred to as MPEG4 bit stream) of a lower bit rate.

An image information conversion apparatus (transcoder) which satisfies the demand is disclosed in Susie J. Wee, John G. Apostlopoulos and Nick Feamster, "Field-to-Frame Transcoding with Spatial and Temporal Downsampling", ICIP '99 (hereinafter referred to as document 1). The image information conversion apparatus mentioned is shown in FIG. 5.

Referring to FIG. 5, the image information conversion apparatus 101 shown includes a picture type discrimination section 111, an MPEG2 image information (I picture and P picture) decoding section 112, a reduction section 113, a video memory 114, an MPEG4 image information (I/P-VOP) coding section 115, a motion vector synthesis section 116, and a motion vector detection section 117. It is to be noted that the VOP (Video Object Plane) in the MPEG4 corresponds to the frame in the MPEG2.

The picture type discrimination section 111 receives data of frames of MPEG2 image compression information (hereinafter referred to as MPEG2 bit stream) of an interlaced scan as an input thereto and discriminates whether data of each frame is of MPEG2 image information (hereinafter referred to as I picture and P picture which signify an intra-image coded picture and a forward predictive coded picture, respectively) or of a B picture (bi-directionally predicted picture). The picture type discrimination section 111 outputs only the former data to the MPEG2 image information decoding section 112 of the following stage.

The MPEG2 image information decoding section 112 executes processing similar to that of an ordinary MPEG2 image information decoding section. However, since data regarding B pictures are discarded by the picture type discrimination section 111, it is only required for the MPEG2 image information decoding section 112 to have a function of decoding only I/P pictures.

The reduction section 113 receives pixel values from the MPEG2 image information decoding section 112 and performs processing of reducing the pixel values to ½ in the horizontal direction and discarding data of one of the first and second fields in the vertical direction while leaving data of the other field to produce a progressive scan image having a size of ¼ that of the inputted image information.

If the MPEG2 bit stream inputted from the MPEG2 image information decoding section 112 represents images compliant with the standards of the NTSC (National Television System Committee), that is, interlaced scan images of 720× 480 pixels and 30 Hz, then the images after the reduction by the reduction section 113 have a size of 360×240 pixels. However, in order to allow the processing in a unit of a macro block when the MPEG4 image information coding section 115 in a succeeding stage performs coding, the pixel numbers both in the horizontal and vertical directions must be multiples of 16. Accordingly, the reduction section 113 further performs supplementation or discarding of pixels for satisfying the requirement. In particular, in the specific case described above, eight lines, for example, at the right end or the left end in the horizontal direction are discarded so that the image has a size of 352×240 pixels.

The progressive scan image produced by the reduction section 113 is stored into the video memory 114 and then undergoes coding processing by the MPEG4 image information coding section 115, and is outputted as an MPEG4 bit stream.

Motion vector information in the inputted MPEG2 bit stream is supplied to the motion vector synthesis section 116, by which it is mapped to motion vectors for the image information after the reduction.

The motion vector detection section 117 detects motion vectors of a high degree of accuracy based on the motion vector values synthesized by the motion vector synthesis section 116.

The image information conversion apparatus 101 disclosed in document 1 produces an MPEG4 bit stream of progressive scan images having a size of ½×½ that of an inputted MPEG2 bit stream. For example, where the inputted MPEG2 bit stream complies with the NTSC standards, the MPEG4 bit stream to be outputted has the SIF size (352×240 pixels). The image information conversion apparatus 101 can convert the inputted MPEG2 bit stream also into an image of any other image size, for example, the QSIF (176×112 pixels) size which is a size of approximately ¼×¼ in the example described above, by modifying the operation of the reduction section 113.

Further, the image information conversion apparatus 101 performs, as a process by the MPEG2 image information decoding section 112, a decoding process using all of eighth-order discrete cosine transform coefficients in the inputted MPEG2 bit stream for the horizontal and vertical directions or a decoding process using only low-frequency components from among eighth-order discrete cosine transform coefficients only for the horizontal direction or for both of the horizontal and vertical directions thereby to reduce the arithmetic operation amount for the decoding process and the video memory capacity while suppressing the picture quality deterioration to the minimum.

In the image information conversion apparatus 101 shown in FIG. 5, the code amount control of the MPEG4 image information coding section 115 makes a significant factor of determination of the picture quality of an MPEG4 bit stream. In the ISO/IEC 14496-2, the system for code amount control is not specifically prescribed, and each vendor can use a system which is considered optimum from the point of view of the arithmetic operation amount and the output picture quality in accordance with an application to be used. In the following, a system prescribed in the MPEG2 Test Mode 15 (ISO/IEC JTC1/SC29/WG11 N0400) as a representative code amount control system is described.

For the code amount control, bit distribution to each picture is performed as a first step using a target code amount (target bit rate) and a GOP (Group of Pictures) configuration as input variables. The GOP signifies a group of a plurality of pictures of different types arrayed in accordance with certain specifications. Then, rate control is performed using a virtual buffer, whereafter adaptive quantization for each macro block is performed finally taking a visual characteristic into consideration. The operation of the code amount control is illustrated in FIG. 6.

Referring to FIG. 6, first in step S101, the MPEG4 image information coding section 115 distributes an allocation bit amount for each picture in a GOP in accordance with a bit amount (hereinafter represented by R) to be allocated to those pictures which are not decoded as yet including allocation object pictures. This distribution is repeated in order of coded pictures in the GOP. In this instance, the code amount allocation to each picture is performed based on the following two assumptions.

First, it is assumed that the product of an average quantization scale code to be used for coding of each picture and the generated code amount is fixed for each picture type unless the screen does not change. Therefore, after each picture is coded, variables $X_i$, $X_p$ and $X_b$ (global complexity measures) each representative of the complexity of the screen are updated in accordance with the following expressions (1) to (3) for individual picture types:

$$X_i = S_i \cdot Q_i \tag{1}$$

$$X_p = S_p \cdot Q_p \tag{2}$$

$$X_b = S_b \cdot Q_b \tag{3}$$

where $S_i$, $S_p$ and $S_b$ are the generated code bit amounts upon picture coding, and $Q_i$, $Q_p$ and $Q_b$ are average quantization scale codes upon picture coding. The variables $X_i$, $X_p$ and $X_b$ have initial values represented by the following expressions (4) to (6), respectively, using the target code amount (target bit rate) bit_rate [bits/sec]:

$$X_i = 160 \times \text{bit\_rate}/115 \tag{4}$$

$$X_p = 60 \times \text{bit\_rate}/115 \tag{5}$$

$$X_b = 42 \times \text{bit\_rate}/115 \tag{6}$$

Secondly, it is assumed that the picture quality of the entire image is always optimized when the ratios $K_p$ and $K_b$ of the quantization scale code of P and B pictures with reference to the quantization scale code of an I picture have values defined by the following expression (7):

$$K_p = 1.0; \quad K_b = 1.4 \tag{7}$$

In particular, the quantization scale code of a B picture is always 1.4 times that of the quantization scale codes of I and P pictures. Here, it is supposed that, by coding a B picture rather roughly than I and P pictures, if the code amount saved with a B picture is added to that of an I or P picture, then the picture quality of the I or P picture is improved, and also the picture quality of a B picture which refers to the I or P picture is improved.

From the two assumptions specified as above, the allocation bit amounts ($T_i$, $T_p$, $T_b$) to the different pictures of the GOP have values given by the following expressions (8) to (10), respectively:

$$T_i = \max\left\{\frac{R}{1 + \frac{N_p \cdot X_p}{X_i \cdot K_p} + \frac{N_b \cdot X_b}{X_i \cdot K_b}}, \frac{\text{bit\_rate}}{8 \times \text{picture\_rate}}\right\} \tag{8}$$

$$T_p = \max\left\{\frac{R}{N_p + \frac{N_b \cdot K_p \cdot X_b}{K_b \cdot X_p}}, \frac{\text{bit\_rate}}{8 \times \text{picture\_rate}}\right\} \tag{9}$$

$$T_b = \max\left\{\frac{R}{N_b + \frac{N_p \cdot K_b \cdot X_p}{K_p \cdot X_b}}, \frac{\text{bit\_rate}}{8 \times \text{picture\_rate}}\right\} \tag{10}$$

where $N_p$ and $N_b$ are the numbers of P and B pictures which are not coded in the GOP as yet.

Based on the allocated code amounts determined in this manner, each time a picture is coded in steps S101 and S102, the bit amount R to be allocated to a non-coded picture in the GOP is updated in accordance with the following expression (11):

$$R = R - S_{i,p,b} \tag{11}$$

On the other hand, when the first picture in the GOP is to be coded, the bit amount R is updated in accordance with the following expression (12):

$$R = \frac{\text{bit\_rate} \times N}{\text{picture\_rate}} + R \tag{12}$$

where N is the number of pictures in the GOP. The initial value of the bit amount R at the start of a sequence is 0.

In step S102, in order to make the allocation bit amounts ($T_i$, $T_p$, $T_b$) to the pictures determined in accordance with the expressions (8) to (10) in step S101 and actual generation code amounts coincide with each other, quantization scale codes are determined based on capacities of three different virtual buffers set independently of each other for the individual pictures by feedback control in a unit of a macro block. First, prior to code of a j-th macro block, the occupation amounts of the virtual buffers are determined in accordance with the following expressions (13) to (15):

$$d_j^i = d_0^i + B_{j-1} - \frac{T_i \times (j-1)}{MB\_cnt} \quad (13)$$

$$d_j^p = d_0^p + B_{j-1} - \frac{T_p \times (j-1)}{MB\_cnt} \quad (14)$$

$$d_j^b = d_0^b + B_{j-1} - \frac{T_b \times (j-1)}{MB\_cnt} \quad (15)$$

where $d_0^i$, $d_0^p$ and $d_0^b$ are the initial occupation amounts of the virtual buffers, $B_j$ is the generation bit amount from the top of the picture to the j-th macro block, and MB_cnt is the number of macro blocks in 1 picture. The occupation amounts ($d_{MB\_cnt}^i$, $d_{MB\_cnt}^p$, $d_{MB\_cnt}^b$) of the virtual buffers upon ending of coding of the individual pictures are used as initial values ($d_0^i$, $d_0^p$, $d_0^b$) for the virtual buffer occupations for the next pictures.

Then, the quantization scale code $Q_j$ for the j-th macro block is calculated in accordance with the following expression (16):

$$Q_j = \frac{d_j \times 31}{r} \quad (16)$$

where r is a variable called reaction parameter used to control the response of a feedback loop and given by the following expression (17):

$$r = 2 \times \frac{bit\_rate}{picture\_rate} \quad (17)$$

The initial values of the virtual buffers at the start of coding are given by the following expressions (18) to (20):

$$d_0^i = 10 \times \frac{r}{31} \quad (18)$$

$$d_0^p = k_p \cdot d_0^i \quad (19)$$

$$d_0^b = K_b \cdot d_0^i \quad (20)$$

In step S103, the quantization scale codes determined in step S102 are modified with a variable called activity for each macro block so that they may be quantized finely at a flat portion at which deterioration can be visually observed comparatively conspicuously but may be quantized roughly at a complicated pattern portion at which deterioration can be visually observed comparatively less conspicuously.

The activity is given by the following expression (21) using pixel values of totaling 8 blocks including 4 blocks of a frame discrete cosine transform mode and 4 blocks of a field discrete cosine transform mode using brightness signal pixel values of the original picture:

$$act_j = 1 + \min_{sblk=1,8}(var\_sblk) \quad (21)$$

$$var\_sblk = \frac{1}{64}\sum_{k=1}^{64}(P_k - \overline{P})^2$$

$$\overline{P} = \frac{1}{64}\sum_{k=1}^{64} P_k$$

where $P_k$ is the brightness signal intra-block pixel value of the original image. The reason why a minimum value is taken in the expression (21) is that it is intended to use finer quantization where a flat portion is included only at a portion in the macro block.

Further, a normalized activity $Nact_j$ whose value ranges from 0.5 to 2 is determined in accordance with the following expression (22):

$$Nact_j = \frac{2 \times act_j + avg\_act}{act_j + 2 \times avg\_act} \quad (22)$$

where avg-act is the average value of the activity $act_j$ of the picture coded last.

A quantization scale code $mquant_j$ with a visual characteristic taken into consideration is determined in accordance with the following expression (23) based on the quantization scale code $Q_j$ determined in step S102:

$$mquant_j = Q_j \times N\_act_j \quad (23)$$

By the way, as recited in "Theoretical Analysis of the MPEG Compression Efficiency and Application thereof to the Code Amount Control", Shingaku Giho, IE-95, DSP95-10, May 1995 (hereinafter referred to as document 2), the code amount control system defined in the MPEG2 Test Mode 15 does not always provide a good picture quality in an MPEG2 image coding section.

In document 2, the following system is proposed particularly as a technique for providing an optimum code amount distribution for each of frames in a GOP.

Where $N_I$, $N_P$ and $N_B$ are the numbers of those I, P and B pictures in a GOP which are not coded as yet and the code amounts to be applied to them are represented by $R_I$, $R_P$ and $R_B$, respectively, such a fixed rate condition as given by the following expression (24) is satisfied:

$$R = N_I \cdot R_I + N_P \cdot R_P + N_B \cdot R_B \quad (24)$$

Where the quantization step sizes of individual frames are represented by $Q_I$, $Q_P$ and $Q_B$ and m is an order number for coordinating a quantization step size and a reproduction error variance with each other, that is, if it is assumed that minimization of an average of the quantization step sizes raised to the m-th power minimizes the reproduction error variance, then an optimum code amount distribution for each frame in the GOP is given by minimizing the expression (25) given below:

$$\frac{N_I \cdot Q_I^m + N_P \cdot Q_P^m + N_B \cdot Q_B^m}{N_I + N_P + N_B} \quad (25)$$

It is to be noted that the average scale Q and the code amount R of the frames are coordinated with the complexity X of each frame as a medium variable used also in the MPEG2 Test Mode 15 as given by the following expression (26):

$$Q \cdot R^a = X \quad (26)$$

Accordingly, by calculating such code amounts $R_I$, $R_P$ and $R_B$ as minimize the expression (25) using the Lagrange's method of undetermined multipliers taking the expression (26) into consideration under the restrictive condition of the expression (24), such values as given by the following expressions (27) to (29) are determined as optimum code amounts $R_I$, $R_P$ and $R_B$, respectively:

$$R_I = \frac{R}{1 + N_P \cdot \left(\frac{X_P}{X_I}\right)^{\frac{m}{1+m\alpha}} + N_B \cdot \left(\frac{X_B}{X_I}\right)^{\frac{m}{1+m\alpha}}} \quad (27)$$

$$R_P = \frac{R}{N_P + N_B \cdot \left(\frac{X_B}{X_P}\right)^{\frac{m}{1+m\alpha}}} \quad (28)$$

$$R_B = \frac{R}{N_B + N_P \cdot \left(\frac{X_P}{X_B}\right)^{\frac{m}{1+m\alpha}}} \quad (29)$$

Where a α=1, the expressions (27) to (29) and the expressions (8) to (10) given hereinabove in the code amount control system defined in the MPEG2 Test Mode 15 have the following relationship. In particular, from the expressions (27) to (29), the parameters $K_p$ and $K_b$ for code amount control are adaptively calculated in accordance with the following expression (30) based on the complexities $X_I$, $X_P$ and $X_B$ of each frame:

$$K_p = \left(\frac{X_I}{X_P}\right)^{\frac{1}{1+m}}; \quad K_b = \left(\frac{X_I}{X_B}\right)^{\frac{1}{1+m}} \quad (30)$$

In document 2, it is disclosed that a good picture quality is obtained by setting the value of 1/(1+m) of the expression above to 0.6 to 1.2.

However, when the image information conversion apparatus 101 described above with reference to FIG. 5 performs code amount control using the technique defined in the MPEG2 Test Mode 15, since it cannot cope with a variation in complexity which is caused by a scene change or the like occurring in a GOP, it is difficult to perform the code amount control stably, which sometimes results in picture quality deterioration.

Thus, another image information conversion apparatus is proposed and is shown in FIG. 7. Referring to FIG. 7, the image information conversion apparatus 102 shown includes, in addition to the components of the image information conversion apparatus 101 described hereinabove with reference to FIG. 5, a compression information analysis section 118, an information buffer 119, a complexity calculation section 120 and an MPEG4 image information coding section 121. Detailed description of the common components to those of the image information conversion apparatus 101 of FIG. 5 is omitted herein to avoid redundancy.

The compression information analysis section 118 analyzes an average value Q over an entire frame of the quantization scale used for decoding processing and a total code amount (bit number) B allocated to the frame in the MPEG2 bit stream and sends necessary information to the information buffer 119.

The information buffer 119 stores such generated code amounts (bit numbers) and average quantization scales of I/P pictures of the MPEG2 bit stream.

The complexity calculation section 120 calculates an estimated value of the complexity X for each VOP of MPEG4 image compression information (hereinafter referred to as MPEG4 bit stream) from the information Q and B of each frame stored in the information buffer 119 in accordance with the expression (20) given hereinabove.

The average value Q over the entire frame of the quantization scale used for the decoding processing by the compression information analysis section 118 and the total code amount (bit number) B allocated to the frame in the MPEG2 bit stream are stored into the information buffer 119.

The complexity calculation section 120 calculates the complexity X of each frame stored in the information buffer 119 from the information Q and B for the frame in accordance with the following expression (31):

$$X = Q \cdot B \quad (31)$$

The complexities X of the frames calculated in accordance with the expression (31) above are buffered for one GOV and then sent as a parameter for code amount control to the MPEG4 image information coding section 121. Therefore, a delay for one GOV is required. This delay is implemented using the video memory 114 serving as a delay buffer.

In the following, description is given of in what manner the complexity X of each frame in the GOV calculated in accordance with the expression (31) is used by the MPEG4 image information coding section 121. It is to be noted that, in the following description, also a case wherein the apparatus does not include the picture type discrimination section 111 and does not perform conversion of the frame rate is taken into consideration.

The parameters $K_p$ and $K_b$ determined in accordance with the expression (30) represent that the ratios of ideal quantization scales $Q_{p\_ideal}$ and $Q_{b\_ideal}$ for a P-VOP/B-VOP to an ideal average quantization scale $Q_{1\_ideal}$ for an I-VOP are given by the following expression (32):

$$\frac{Q_{p\_ideal}}{Q_{i\_ideal}} = K_p; \quad \frac{Q_{b\_ideal}}{Q_{i\_ideal}} = K_b \quad (32)$$

In the MPEG2 Test Mode 15, the parameters $K_p$ and $K_b$ are not calculated adaptively as in the expression (30), but such fixed values as given by the expression (7) are used therefor.

From the expressions (30) and (32), where the complexities of an arbitrary VOP 1 and another arbitrary VOP 2 are represented by $X_1$ and $X_2$ and the ideal quantization scales are represented by $Q_{1\_ideal}$ and $Q_{2\_ideal}$, respectively, then the following expression (33) is obtained:

$$\frac{Q_{2\_ideal}}{Q_{1\_ideal}} = \left(\frac{X_1}{X_2}\right)^{\frac{1}{1+m}} \equiv K(X_1, X_2) \quad (33)$$

However, where it is desired to use fixed values as given by the expression (7) as in the MPEG2 Test Mode 15, the following expression (34) should be used in place of the expression (33) above:

$$K(X_1, X_2) \equiv \begin{cases} K_p(1 = I - VOP, 2 = P - VOP) \\ K_b(1 = I - VOP, 2 = B - VOP) \\ \dfrac{K_b}{K_p}(1 = P - VOP, 2 = B - VOP) \\ \dfrac{K_p}{K_b}(1 = B - VOP, 2 = P - VOP) \\ 1(\text{when 1 and 2 are the same type of } VOP) \end{cases} \quad (34)$$

Here, it is assumed that the total code amount (bit number) allocated to non-coded VOPs in a GOV is represented by R and the total code amount R is allocated as $R_1$, $R_2, \ldots, R_n$ to the VOPs. In this instance, the relational expression given as the following expression (35) is satisfied by the total code amount and the allocated code amounts $R_1$, $R_2, \ldots, R_n$:

$$R = R_1 + R_2 + \ldots R + \tag{35}$$

Among the average quantization scale $Q_k$, allocated code amount $R_k$ and complexity $X_k$ of an arbitrary $VOP_k$, the relationship represented by the following expression (36) is satisfied:

$$X_k = Q_k \cdot R_k \tag{36}$$

Here, by transforming the expression (35) taking the expression (36) into consideration, the following expression (37) is obtained:

$$R_1 = \frac{R}{\frac{R_1 + R_2 + \ldots + R_n}{R_1}} = \frac{R}{1 + \frac{R_2}{R_1} + \ldots + \frac{R_n}{R_1}} \tag{37}$$

$$= \frac{R}{1 + \frac{Q_1}{Q_2} \cdot \frac{X_2}{X_1} + \ldots + \frac{Q_1}{Q_n} \cdot \frac{X_n}{X_1}}$$

$$= \frac{R}{1 + \frac{1}{K(X_1, X_2)} \cdot \frac{X_2}{X_1} + \ldots + \frac{1}{K(X_1, X_n)} \cdot \frac{X_n}{X_1}}$$

Although the value obtained by the expression (33) or the value obtained by the expression (34) may be used for $K(X_1, X_2)$ in the expression (37), use of the former can achieve a more optimum code amount distribution suitable for an image.

Thereupon, if the value of $1/(1+m)$ is set to 1.0, then the necessity for exponential operation is eliminated, and consequently, high speed execution can be achieved. Further, even where the value of $1/(1+m)$ is set to a value other than 1.0, high speed execution can be achieved if a table is prepared in advance and referred to to perform exponential operation.

While the complexity $X_k$ of each VOP according to the expression (37) is obtained by MPEG4 image coding, if it is assumed that the complexity of each frame by MPEG2 image coding and the complexity of each frame by MPEG4 image coding are equal to each other, then if the complexity $X_k$ stored in the complexity calculation section 120 is used, then a target code amount for the VOP can be calculated in accordance with the expression (37).

FIG. 8 illustrates a process when the image information conversion apparatus 102 calculates a target code amount.

Referring to FIG. 8, first in step S111, the MPEG2 image information decoding section 112 extracts the average quantization scale Q and the allocated code amount (bit number) B of each frame in a GOP.

In step S112, the complexity calculation section 120 calculates the complexity X by operation of the product of the average quantization scale Q and the allocated code amount (bit number) B of each frame in the GOP.

Then in step S113, the MPEG4 image information coding section 121 calculates a target code amount (target bit rate) based on the complexity X.

The image information conversion apparatus 102 produces an MPEG4 bit stream of images of a progressive scan having a size of ½×½ of the inputted MPEG2 bit stream. In particular, if the input MPEG2 bit stream complies with the NTSC standards, then the MPEG4 bit stream outputted has the SIF size (352×240) The image information conversion apparatus 102 can change the operation of the reduction section 113 to convert the input MPEG2 bit stream into images of any other image size, for example, in the example described above, into images of the QSIF (176×112 pixels) which is an image size of approximately ¼×¼.

Further, the image information conversion apparatus 102 performs, as processing by the MPEG2 image information decoding section 112, a decoding process using all of eighth-order discrete cosine transform coefficients in the inputted MPEG2 bit stream in both of the horizontal and vertical directions and a decoding process using only low frequency components of eighth-order discrete cosine transform coefficients only in the horizontal direction or in both of the horizontal and vertical directions thereby to reduce the arithmetic operation amount and the video memory capacity involved in decoding processing while suppressing the picture quality deterioration.

If the image information conversion apparatus 102 shown in FIG. 7 is used for conversion of an MPEG2 bit stream having a GOP structure of, for example, n=15 and m=3, then an MPEG4 bit stream having a GOV structure of n=5 and m=1 is obtained as an output. Since the MPEG4 bit stream obtained in this manner has a great number of I-VOPs, the coding efficiency is low and a good picture quality is not obtained in some cases. This problem, however, can be solved by converting an image of an I picture in the input MPEG2 bit stream into a P-VOP of the MPEG4 bit stream to develop GOVs.

The image information conversion apparatus 102 performs motion detection within a fixed search range of an image, which originally is an I picture and includes no motion vector, based on motion vectors used for the last P picture immediately preceding to the I picture to calculate motion vectors with a high degree of accuracy for the corresponding VOP thereby to prevent the image quality deterioration.

Further, if an I picture is converted into a P-VOP, then since the original complexity relates to the I picture, it has an inappropriate value as the complexity after the conversion. The image information conversion apparatus 102, however, solves the problem just described by using the complexity for the immediately preceding P picture to eliminate image quality deterioration.

However, while the MPEG2 Text Mode 15 assumes that the complexities $X_i$, $X_p$ and $X_b$ as variables representative of the degree of complexity of an image of I, P and B pictures in a GOP are fixed, if the MPEG4 image information coding section 115 actually uses the technique defined in the MPEG2 Test Mode 15 to perform code amount control, then the assumption is not satisfied in such a case that the GOP includes a scene change or the background exhibits a remarkable variation in the GOP, but rather disturbs stabilized code amount control and makes a cause of picture quality deterioration.

Conversion of an I picture of an inputted MPEG2 bit stream into a P-VOP of an MPEG4 bit stream is considered here.

FIG. 9 diagrammatically illustrates a manner wherein an I picture of an inputted MPEG2 bit stream is converted into and outputted as a P-VOP of an MPEG4 bit stream. Referring to FIG. 9, conversion of the second I picture $I_1$ into a P-VOP is taken as an example. In this instance, as the complexity as a parameter for code amount control for the I picture $I_1$, the complexity $X_{P3}$ of the P picture $P_3$ immediately preceding to the I picture $I_1$ is applied.

If the I picture $I_1$ is an image including a scene change, then a comparatively great code amount must be applied to the I picture $I_1$. However, since the complexity $X_{P3}$ of the P picture $P_3$ of the immediately preceding frame is used as, the complexity for the I picture $I_1$ as described above, a sufficient code amount is not allocated to the I picture $I_1$, resulting in deterioration of the picture quality.

SUMMARY OF THE INVENTION

It is an object of the present invention to provide an image information conversion apparatus and an image information conversion method by which picture quality deterioration caused by conversion from inputted first image compression information into second image compression information to be outputted is prevented.

In order to attain the object described above, according to an aspect of the present invention, there is provided an image information conversion apparatus including: conversion means for converting first image compression information inputted to the image information conversion apparatus into second image compression information to be outputted from the image information conversion apparatus, each of the first image compression information and the second image compression information including at least intra-image coded pictures and inter-image predictive coded pictures; and scene change detection means operable when the conversion means calculates, based on a variable representative of a complexity of a screen for each frame of the inputted first image compression information, a target code amount for each frame of the second image compression information to be outputted for detecting, prior to conversion of an intra-image coded picture of the first image compression information into an inter-image predictive coded picture of the second image compression information, whether or not a scene change is included in a frame of the intra-image coded picture to be converted.

According to another aspect of the present invention, there is provided an image information conversion method including the steps of: converting inputted first image compression information into second image compression information to be outputted, each of the first image compression information and the second image compression information including at least intra-image coded pictures and inter-image predictive coded pictures; and when to calculate, based on a variable representative of a complexity of a screen for each frame of the inputted first image compression information, a target code amount for each frame of the second image compression information to be outputted, prior to conversion of an intra-image coded picture of the first image compression information into an inter-image predictive coded picture of the second image compression information, whether or not a scene change is included in a frame of the intra-image coded picture to be converted.

In the image information conversion apparatus and the image information conversion method, the product of a code amount allocated to each frame and an average quantization scale of the first image compression information may be used as the variable representative of the complexity of the screen for the frame to detect whether or not a scene change is included in the frame. When it is detected that a scene change is included in the frame to be converted, preferably the conversion from the intra-image coded picture into an inter-image predictive coded picture is limited.

Further, the variable representative of the complexity of the screen of the immediately preceding intra-image coded picture may be subtracted from the variable representative of the complexity of the screen of the intra-image coded picture of the inputted first image compression information, and it may be determined that a scene change is included when the absolute value of the difference obtained by the subtraction is higher than a threshold value determined in advance.

With the image information conversion apparatus and the image information conversion method, deterioration of an image involved in conversion of the first image compression information into the second image compression information and deterioration of an image involved in conversion of an intra-image coded picture of the first image compression information into an inter-image predictive coded picture of the second image compression information can be prevented.

The above and other objects, features and advantages of the present invention will become apparent from the following description and the appended claims, taken in conjunction with the accompanying drawings in which like parts or elements denoted by like reference symbols.

DETAILED DESCRIPTION OF THE PREFERRED EMBODIMENT

An image information conversion apparatus according to the present invention detects, upon calculation of a target code amount for each frame of MPEG4 image compression information to be outputted based on the complexity of each frame of inputted MPEG2 image compression information, whether or not the frame to be converted includes a scene change prior to conversion from an intra-image coded picture into an inter-image predictive coded picture, and limits, if a scene change is detected, the conversion from the intra-image coded picture into an inter-image predictive coded picture. Consequently, deterioration of the picture quality which occurs upon conversion from an intra-image coded picture into an inter-picture predictive coded picture can be prevented.

Figure 1:
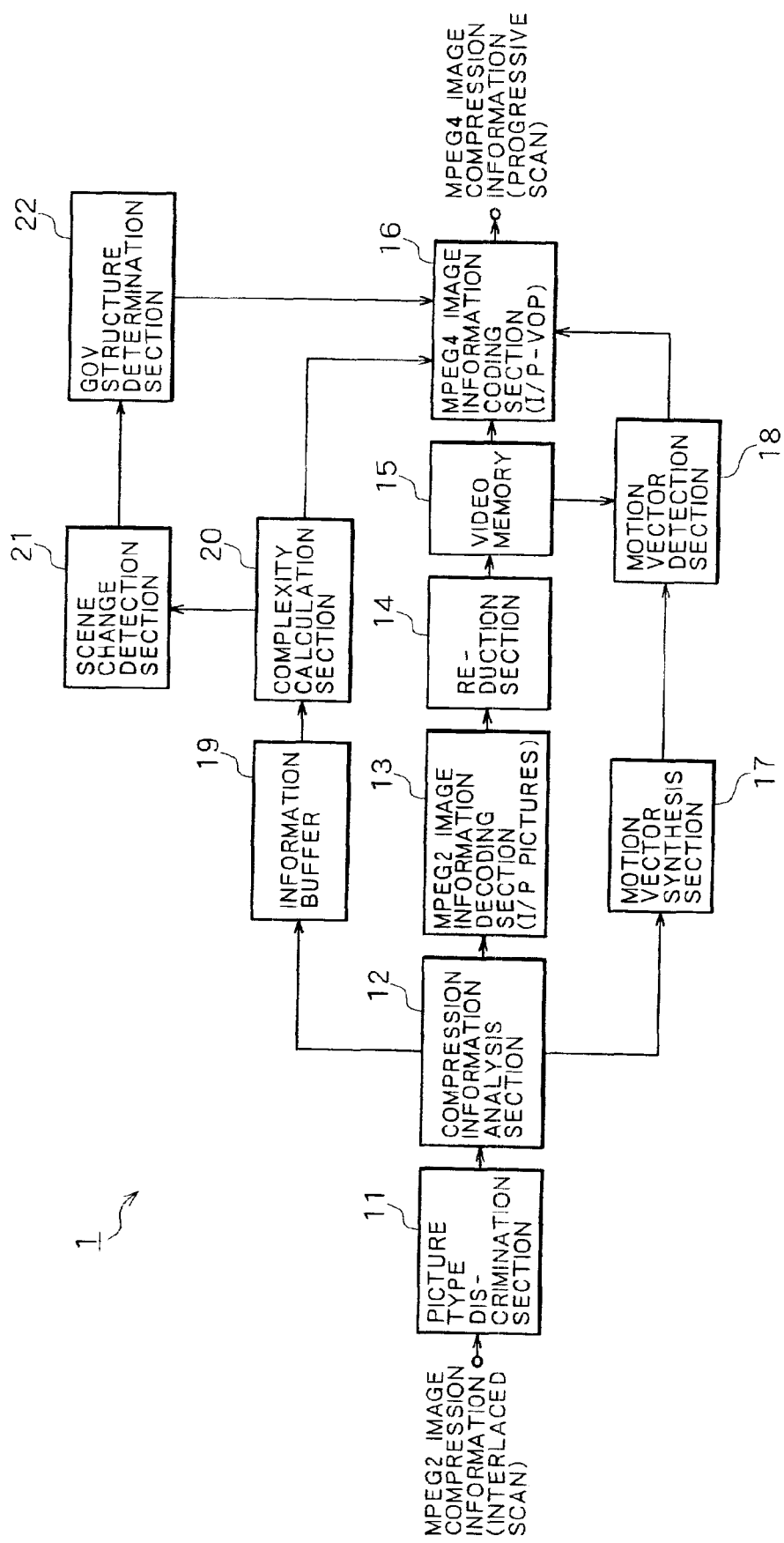
FIG. 1 is a block diagram showing a configuration of an image information conversion apparatus to which the present invention is applied.

Referring to FIG. 1, there is shown an image information conversion apparatus to which the present invention is applied. The image information conversion apparatus 1 shown includes a picture type discrimination section 11, a compression information analysis section 12, a MPEG2 image information decoding section 13, a reduction section 14, a video memory 15, an MPEG4 image information coding section 16, a motion vector synthesis section 17, a motion vector detection section 18, an information buffer 19, a complexity calculation section 20, a scene change detection section 21, and a GOV structure determination section 22.

The picture type discrimination section 11 receives data of frames of MPEG2 image compression information of an interlaced scan (hereinafter referred to as MPEG2 bit stream) as an input thereto and discriminates of which one of an intra-image coded picture (hereinafter referred to as I picture), a forward predictive coded picture (hereinafter referred to as P picture) and a bi-directionally predicted coded picture (hereinafter referred to as B picture) the data of each frame is. The picture type discrimination section 11 transmits information regarding I pictures and P pictures (hereinafter referred to as I/P pictures) to the compression information analysis section 12 of the following stage but discards information regarding B pictures.

The compression information analysis section 12 analyzes a average value Q over an entire frame of the quantization scale used for decoding processing and a total code amount (bit number) B allocated to the frame in the MPEG2 bit stream and sends necessary information to the information buffer 19.

The information buffer 19 stores such generated code amounts (bit numbers) and average quantization scales of I/P pictures of the MPEG2 bit stream.

The complexity calculation section 20 calculates an estimated value of the complexity X for each VOP of MPEG4 image compression information (hereinafter referred to as MPEG4 bit stream) from the information Q and B of each frame stored in the information buffer 19 in accordance with the expression (38) given below. It is to be noted that the VOP (Video Object Plane) corresponds to a frame of the MPEG2.

$$\frac{Q_{p\_ideal}}{Q_{i\_ideal}} = K_p; \frac{Q_{b\_ideal}}{Q_{i\_ideal}} = K_b \tag{38}$$

The MPEG2 image information decoding section 13 performs decoding processing of information regarding I/P pictures of the MPEG2 bit stream. While the MPEG2 image information decoding section 13 is similar to an ordinary MPEG2 image information decoding section, since data regarding B pictures is discarded by the picture type discrimination section 11, it is required that the MPEG2 image information decoding section 13 can decode at least I/P pictures.

The reduction section 14 receives pixel values as an input thereto from the MPEG2 image information decoding section 13, performs a reduction process to ½ in the horizontal direction for the pixel values and then performs a process of discarding data of only one of the first field and the second field in the vertical direction while leaving data of the other field thereby to produce an image of a progressive scan having a size of ¼ that of the inputted image information.

If the MPEG2 bit stream inputted from the MPEG2 image information decoding section 13 represents images conforming with, for example, the standards of the NTSC (National Television System Committee), that is, interlaced scan images of 30 Hz of 720×480 pixels, then the picture size after the reduction processing by the reduction section 14 is 360×240 pixels. However, in order to allow processing to be performed in a unit of a macro block when coding is performed by the MPEG4 image information coding section 16 in a following stage, both of the numbers of pixels of the image in the horizontal and vertical directions must be multiples of 16. Accordingly, the reduction section 14 further performs supplementation or discarding of pixels to satisfy the requirement. In particular, in the case described above, form example, 8 lines at the right end or the left end in the horizontal direction are discarded to produce an image of 352×240 pixels. Here, MPEG4 image information is referred to as I/P-VOP.

The pictures of a progressive scan produced by the reduction section 14 are stored into the video memory 15 and then undergo coding processing by the MPEG4 image information coding section 16, and consequently are outputted as an MPEG4 bit stream.

Motion vector information in the input MPEG2 bit stream is supplied to the motion vector synthesis section 17 and mapped to motion vectors of the image information after the reduction.

The motion vector detection section 18 detects motion vectors of high accuracy based on the motion vector values synthesized by the motion vector synthesis section 17.

The image information conversion apparatus 1 produces an MPEG4 bit stream of images of a progressive scan having a size of ½×½ of the inputted MPEG2 bit stream. In particular, if the input MPEG2 bit stream complies with, for example, the NTSC standards, then the MPEG4 bit stream outputted has the SIF size (352×240). The image information conversion apparatus 1 can change the operation of the reduction section 14 to convert the input MPEG2 bit stream into images of any other image size, for example, in the example described above, into images of the QSIF (176×112 pixels) which is an image size of approximately ¼×¼.

Further, the image information conversion apparatus 1 performs, as processing by the MPEG2 image information decoding section 13, a decoding process using all of eighth-order discrete cosine transform coefficients in the inputted MPEG2 bit stream in both of the horizontal and vertical directions and a decoding process using only low frequency components of eighth-order discrete cosine transform coefficients only in the horizontal direction or in both of the horizontal and vertical directions thereby to reduce the arithmetic operation amount and the video memory capacity involved in decoding processing while suppressing the picture quality deterioration.

The average value Q over the entire frame of the quantization scale used for the decoding processing by the compression information analysis section 12 and the total code amount (bit number) B allocated to the frame in the MPEG2 bit stream are stored into the information buffer 19.

The complexity calculation section 20 calculates the complexity X of each frame stored in the information buffer 19 from the information Q and B for the frame in accordance with the following expression (39):

$$X = Q \cdot B \tag{39}$$

The complexities X of the frames calculated in accordance with the expression (33) above are buffered for one GOV and then sent as a parameter for code amount control to the MPEG4 image information coding section 16. Therefore, a delay for one GOV is required. This delay is implemented using the video memory 15 serving as a delay buffer.

In the following, description is given of in what manner the complexity X of each frame in the GOV calculated in accordance with the expression (39) is used by the MPEG4 image information coding section 16. It is to be noted that, in the following description, also a case wherein the apparatus does not include the picture type discrimination section 11 and does not perform conversion of the frame rate is taken into consideration.

The parameters $K_p$ and $K_b$ determined in accordance with the expression (40) given below represent that the ratios of ideal quantization scales $Q_{p\_ideal}$ and $Q_{b\_ideal}$ for a P-VOP/B-VOP to an ideal average quantization scale $Q_{i\_ideal}$ for an I-VOP are given by the following expression (41):

$$K_p = \left(\frac{X_I}{X_P}\right)^{\frac{1}{1+m}}; \quad K_b = \left(\frac{X_I}{X_B}\right)^{\frac{1}{1+m}} \tag{40}$$

$$\frac{Q_{p\_ideal}}{Q_{i\_ideal}} = K_p; \quad \frac{Q_{b\_ideal}}{Q_{i\_ideal}} = K_b \tag{41}$$

In the MPEG2 Test Mode 15, the parameters $K_p$ and $K_b$ are not calculated adaptively as in the expression (40), but such fixed values as given by the following expression (42) are used therefor:

$$K_p = 1.0; \quad K_b = 1.4 \tag{42}$$

From the expressions (40) and (41), where the complexities of an arbitrary VOP 1 and another arbitrary VOP 2 are represented by $X_1$ and $X_2$ and the ideal quantization scales are represented by $Q_{1\_ideal}$ and $Q_{2\_ideal}$, respectively, then the following expression (43) is obtained:

$$\frac{Q_{2\_ideal}}{Q_{1\_ideal}} = \left(\frac{X_1}{X_2}\right)^{\frac{1}{1+m}} \equiv K(X_1, X_2) \tag{43}$$

However, where it is desired to use fixed values as given by the expression (42) as in the MPEG2 Test Mode 15, the following expression (44) should be used in place of the expression (43) above:

$$K(X_1, X_2) \equiv \begin{cases} K_p(1 = I - VOP, 2 = P - VOP) \\ K_b(1 = I - VOP, 2 = B - VOP) \\ \frac{K_b}{K_p}(1 = P - VOP, 2 = B - VOP) \\ \frac{K_p}{K_b}(1 = B - VOP, 2 = P - VOP) \\ 1 (\text{when 1 and 2 are the same type of } VOP) \end{cases} \tag{44}$$

Here, it is assumed that, where the total code amount (bit number) allocated to non-coded VOPs in a GOV is represented by R, when the total code amount R is allocated as $R_1$, $R_2$, ... $R_n$ to the VOPs, the picture quality of the GOV is optimized. In this instance, the relational expression given as the following expression (45) is satisfied by the total code amount R and the allocated code amounts $R_1, R_2, \ldots, R_n$:

$$R = R_1 + R_2 + \ldots + R_n \tag{45}$$

Among the average quantization scale $Q_k$, allocated code amount $R_k$ and complexity $X_k$ of an arbitrary $VOP_k$, the relationship represented by the following expression (46) is satisfied:

$$X_k = Q_k \cdot R_k \tag{46}$$

In the expression (46) above, the allocated code amount R ($R_k$) may be an allocated code amount (bit number) to each entire frame, an allocated code amount (bit number) to a brightness signal of each frame, or an allocated code amount to brightness and color difference signals of each frame. Further, by transforming the expression (45) taking the expression (46) into consideration, the following expression (47) is obtained:

$$R_1 = \frac{R}{\frac{R_1 + R_2 + \ldots + R_n}{R_1}} = \frac{R}{1 + \frac{R_2}{R_1} + \ldots + \frac{R_n}{R_1}} \tag{47}$$

$$= \frac{R}{1 + \frac{Q_1}{Q_2} \cdot \frac{X_2}{X_1} + \ldots + \frac{Q_1}{Q_n} \cdot \frac{X_n}{X_1}}$$

$$= \frac{R}{1 + \frac{1}{K(X_1, X_2)} \cdot \frac{X_2}{X_1} + \ldots + \frac{1}{K(X_1, X_n)} \cdot \frac{X_n}{X_1}}$$

Although the value obtained by the expression (43) or the value obtained by the expression (44) may be used for $K(X_1, X_2)$ in the expression (47), use of the former can achieve a more optimum code amount distribution suitable for an image.

Thereupon, if the value of $1/(1+m)$ is set to 1.0, then the necessity for exponential operation is eliminated, and consequently, high speed execution can be achieved. Further, even where the value of $1/(1+m)$ is set to a value other than 1.0, high speed execution can be achieved if a table is prepared in advance and referred to to perform exponential operation.

While the complexity $X_k$ of each VOP according to the expression (47) is obtained by MPEG4 image coding, if it is assumed that the complexity of each frame by MPEG2 image coding and the complexity of each frame by MPEG4 image coding are equal to each other, by using the complexity $X_k$ stored in the complexity calculation section 20, a target code amount for the VOP can be calculated in accordance with the expression (47).

Figure 2:
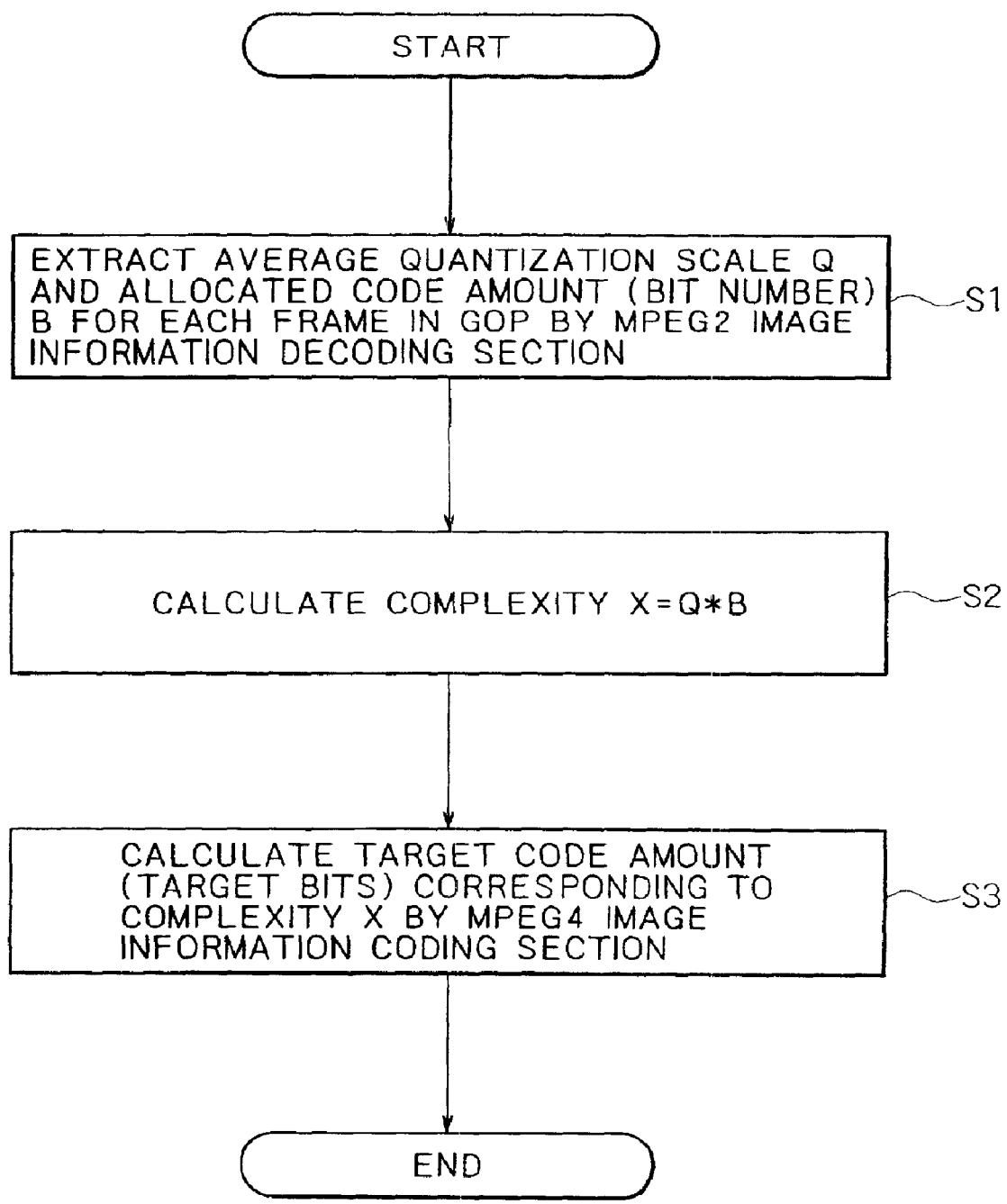
FIG. 2 is a flow chart illustrating operation of the image information conversion apparatus of FIG. 1 when a scene change detection section and a GOV structure determination section detect a scene change.

FIG. 2 illustrates a processing flow when the image information conversion apparatus 1 calculates a target code amount.

Referring to FIG. 2, first in step S1, the MPEG2 image information decoding section 13 extracts the average quantization scale Q and the allocated code amount (bit number) B of each frame in a GOP.

In step S2, the complexity calculation section 20 calculates the complexity X.

Then in step S3, the MPEG4 image information coding section 16 calculates a target code amount (target bit rate) based on the complexity X. Here, estimated values of the complexity for VOPs of the MPEG4 bit stream calculated in accordance with the expression (46) and to be outputted are stored in the complexity calculation section 20.

The scene change detection section 21 detects based on the estimated values of the complexity for the VOPs whether or not an I picture of the inputted MPEG2 bit stream to be converted into a P-VOP of an MPEG4 bit stream which corresponds to a P picture includes a scene change.

Figure 3:
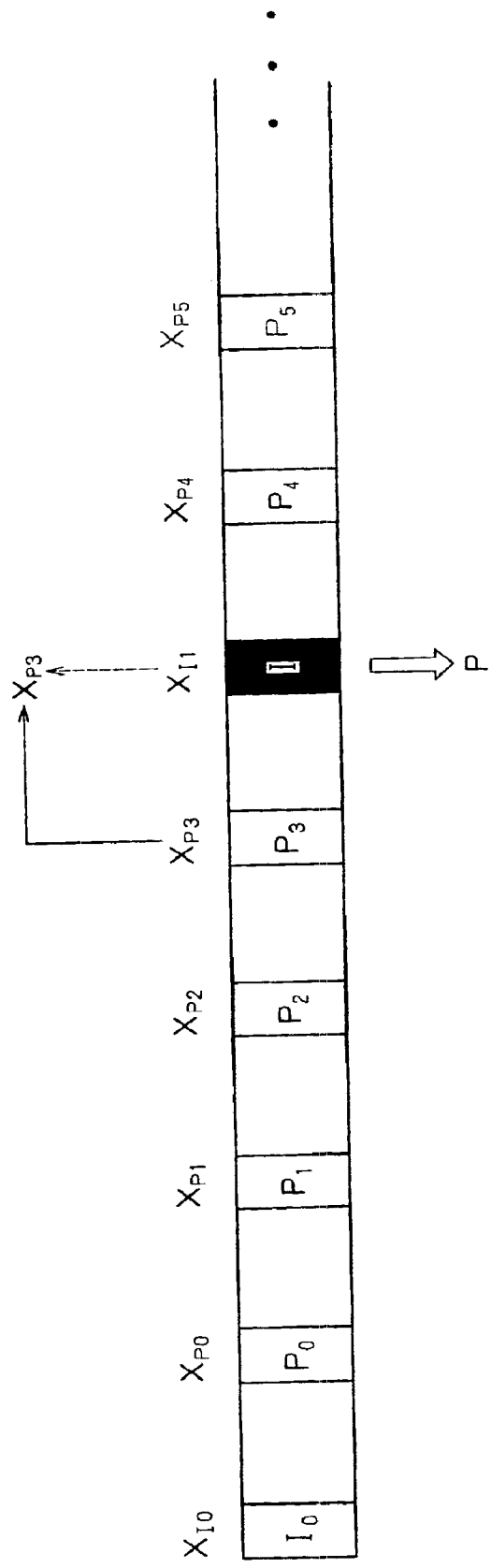
FIG. 3 is a diagrammatic view illustrating a manner wherein the image information conversion apparatus of FIG. 1 converts an I picture of an inputted MPEG2 bit stream into a P-VOP of an MPEG4 bit stream to be outputted.

FIG. 3 diagrammatically illustrates a manner wherein an I picture of an inputted MPEG2 bit stream is converted into and outputted as a P-VOP of an MPEG4 bit stream.

Referring to FIG. 3, reference characters $I_0$ and $I_1$ denote each an I picture of the MPEG2 bit stream, and $P_0, P_1, P_2, P_3, P_4$ and $P_5$ denote each a P picture of the MPEG2 bit stream. Further, reference characters $X_{I0}$ and $X_{I1}$ denote each a complexity as a variable representative of a complexity of a screen of an I picture, and $X_{P0}$, $X_{P1}$ $X_{P2}$, $X_{P3}$, $X_{P4}$ and $X_{P5}$ denote each a complexity as a variable representative of a complexity of a screen of a P picture.

Here, conversion of the second I picture $I_1$ into a P-VOP of an MPEG4 bit stream is considered. In this instance, if the I picture $I_1$, includes a scene change, then in order to prevent picture quality deterioration upon conversion, a comparatively great code amount must be allocated to the I picture $I_1$. Therefore, it is first detected whether or not the I picture $I_1$ includes a scene change.

The scene change detection section 21 of the image information conversion apparatus 1 subtracts, from the complexity $X_{I1}$ of the I picture $I_1$ of the inputted MPEG2 bit stream, the complexity $X_{I0}$ of the immediately preceding I picture $I_0$ of the inputted MPEG2 bit stream, and compares the absolute value of the resulting difference with a threshold value TH determined in advance. Here, it is assumed that a scene change of the I picture $I_1$ is detected when the comparison reveals that the absolute value is higher than the predetermined threshold value TH.

Accordingly, the scene change detection section 21 discriminates that a scene change is included in the I picture $I_1$ when the expression (48) given below is satisfied:

$$|X_{I1}-X_{I0}|>TH \qquad (48)$$

If the scene change detection section 21 detects a scene change, then the GOV structure determination section 22 determines that conversion of the I picture $I_1$ of the MPEG2 bit stream into a P-VOP of an MPEG4 bit stream should not be performed.

Figure 4:
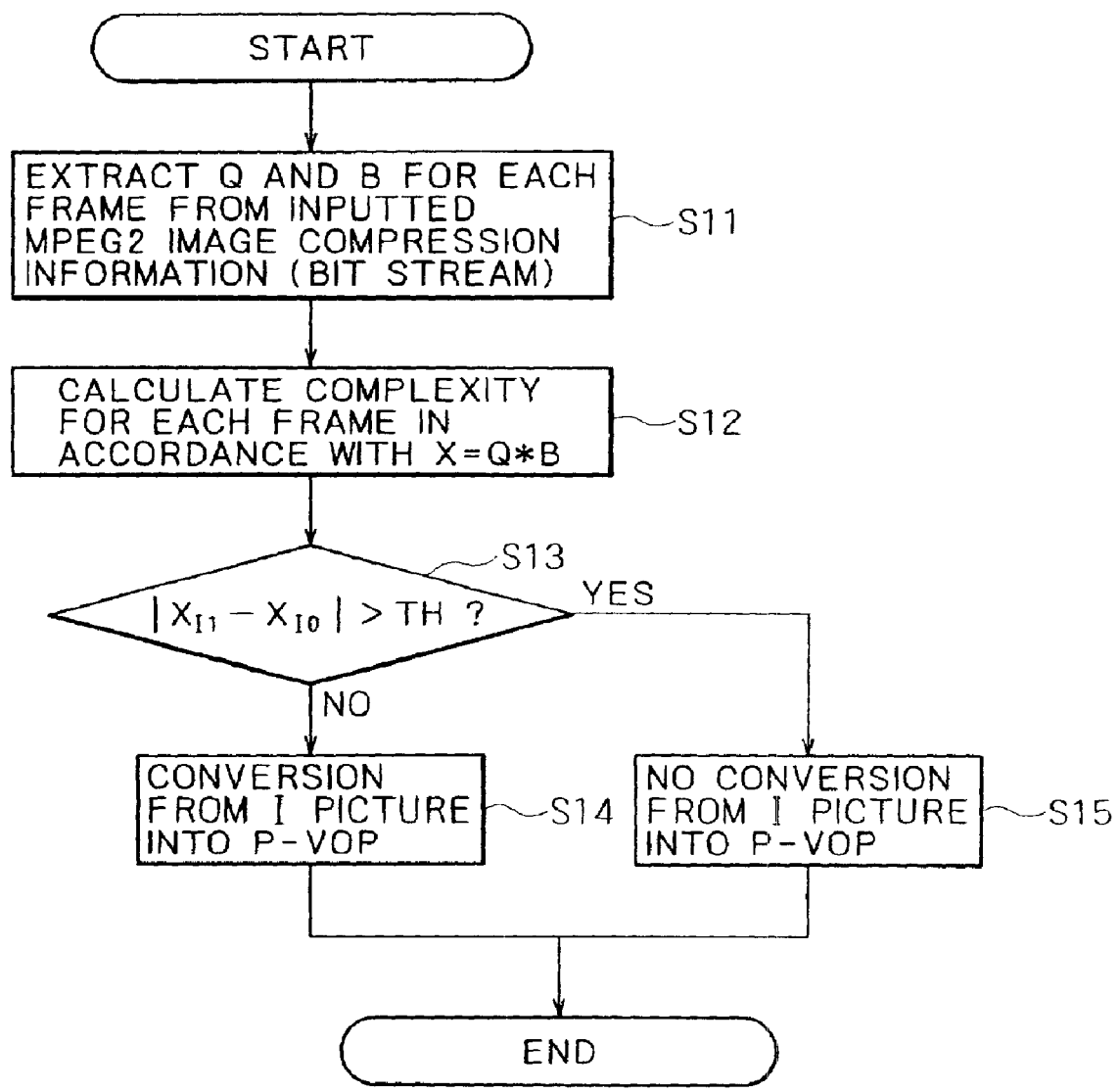
FIG. 4 is a flow chart illustrating operation of the scene change detection section and the GOV structure determination section of the image information conversion apparatus of FIG. 1.
Figure 5:
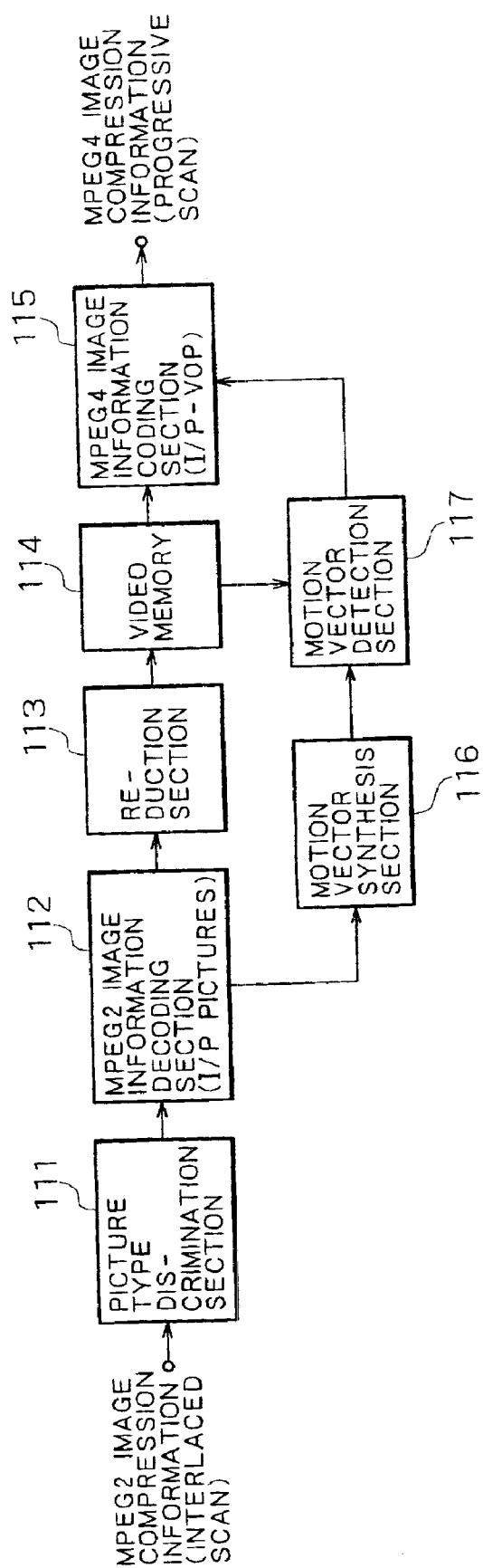
FIG. 5 is a block diagram showing a configuration of a related art image information conversion apparatus.
Figure 6:
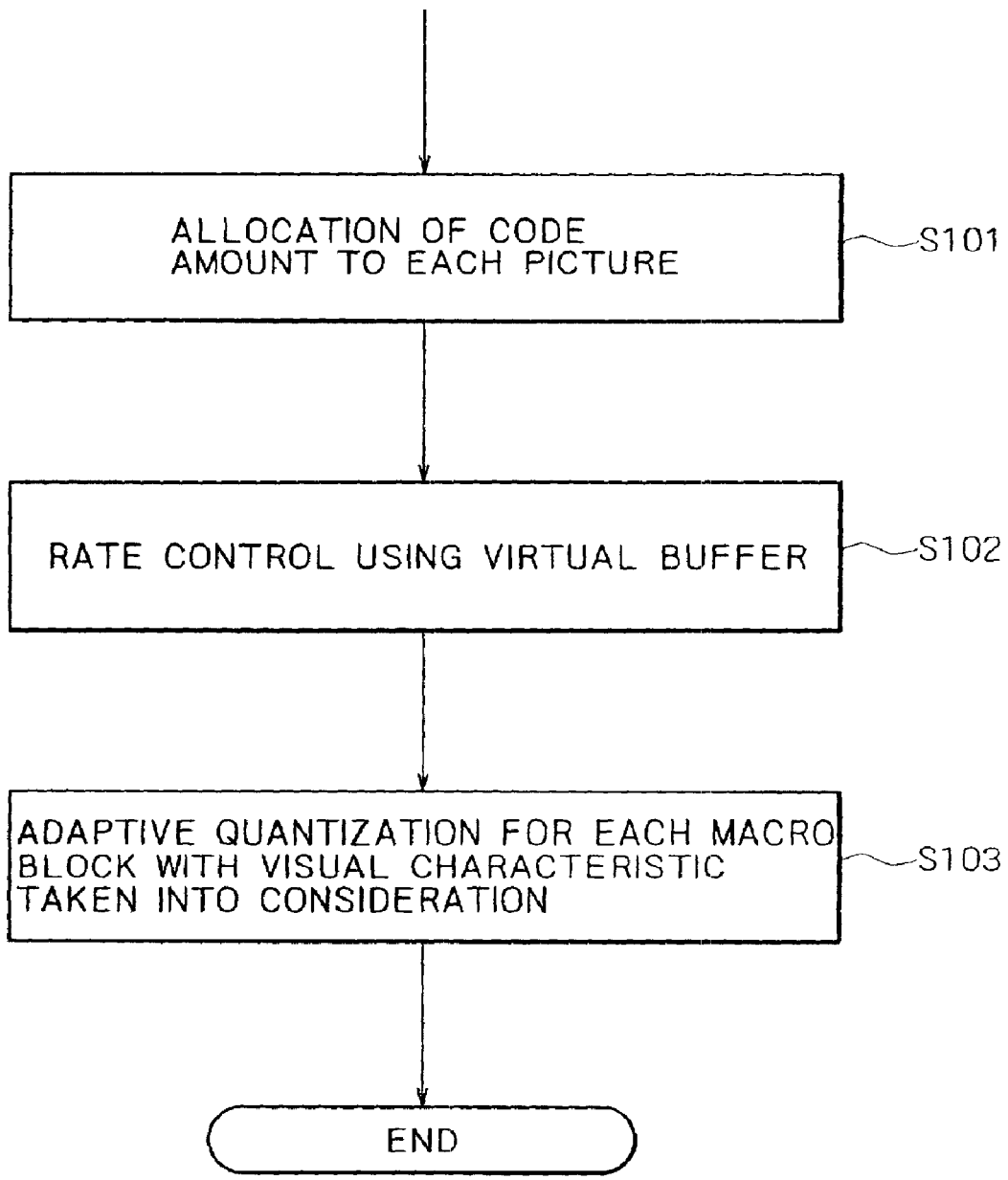
FIG. 6 is a flow chart illustrating operation of an MPEG4 image information coding section of the image information conversion apparatus of FIG. 5 which performs code amount control using a complexity of each frame extracted by an MPEG2 image information decoding section.
Figure 7:
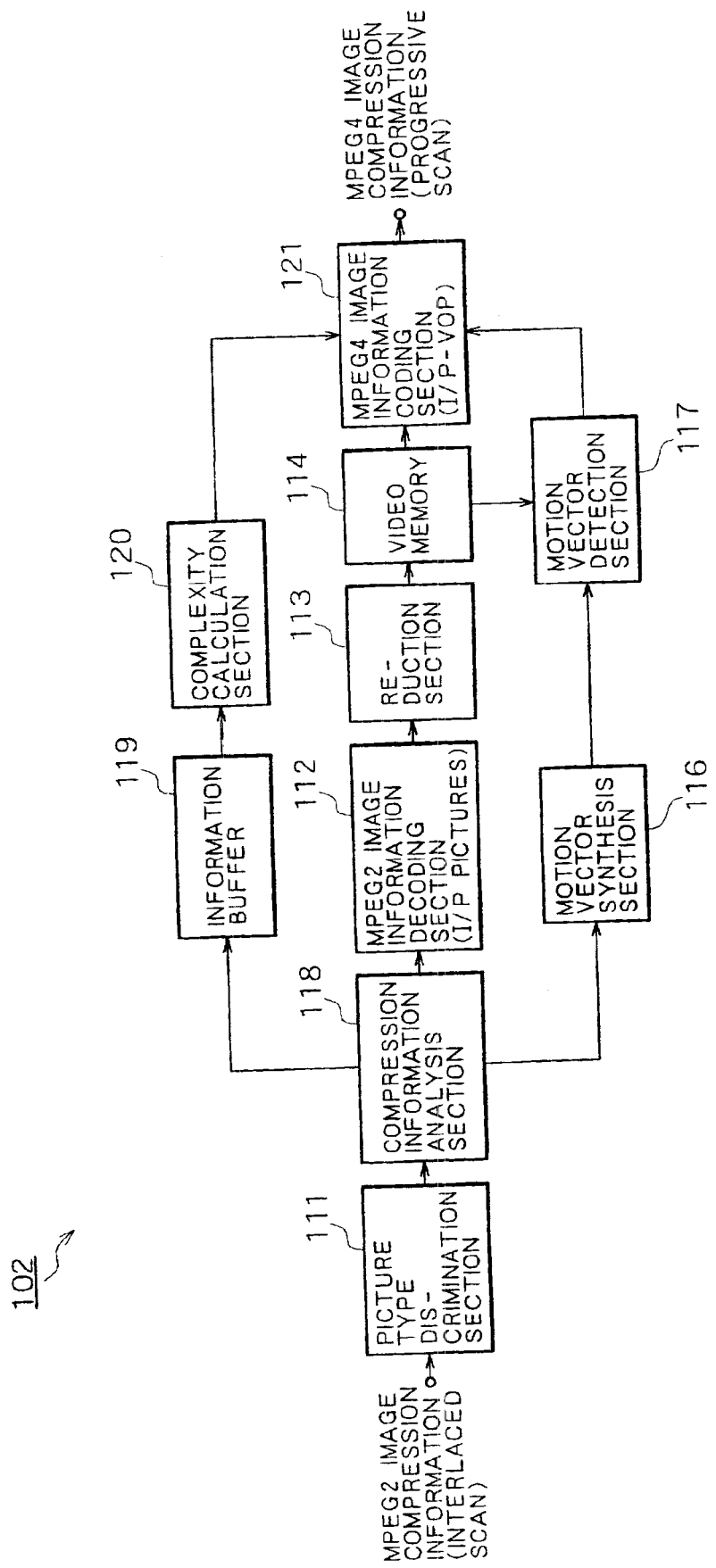
FIG. 7 is a block diagram showing a configuration of another related art image information conversion apparatus.
Figure 8:
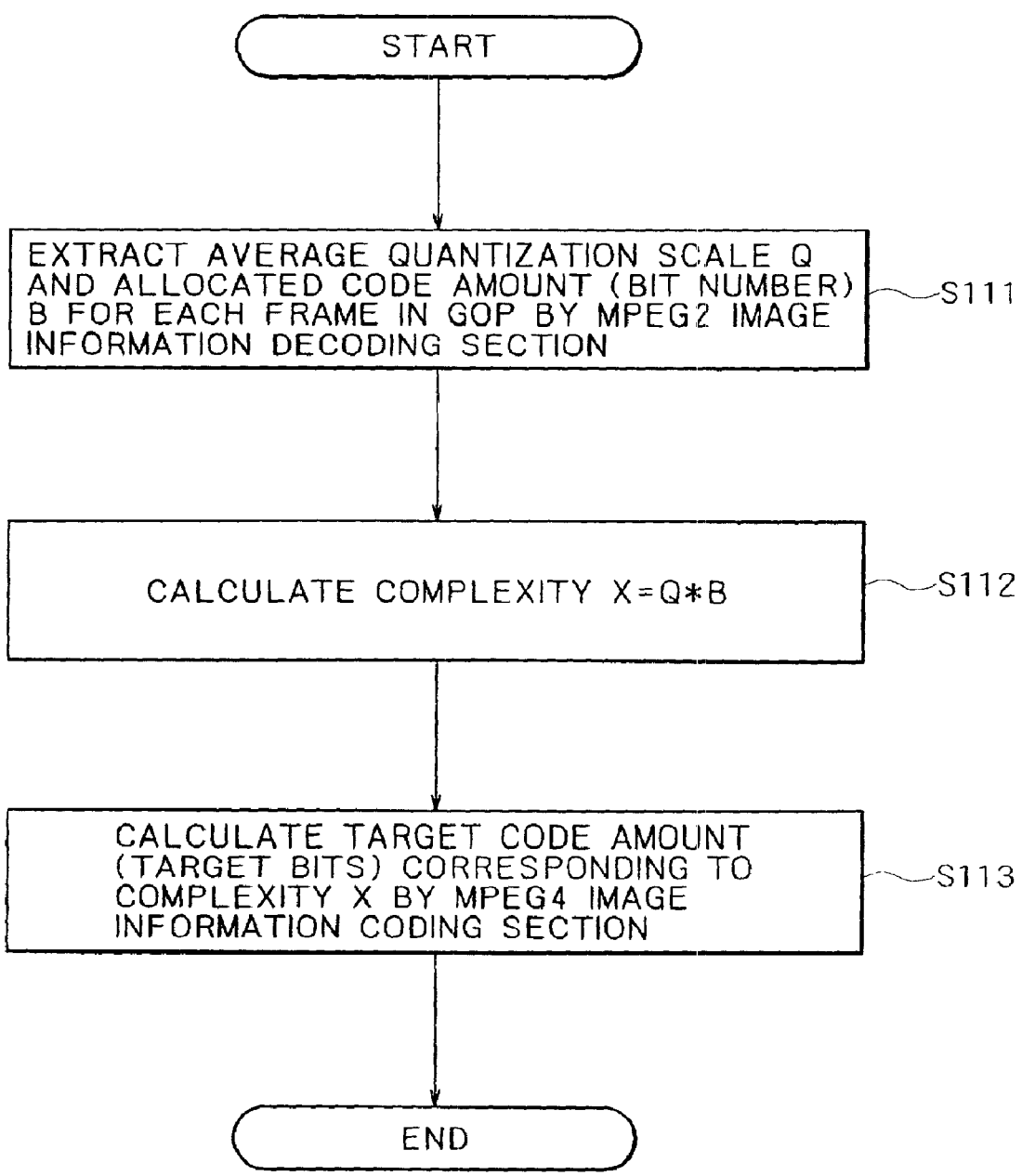
FIG. 8 is a flow chart illustrating operation of the image information conversion apparatus of FIG. 7 when it calculates a target code amount.
Figure 9:
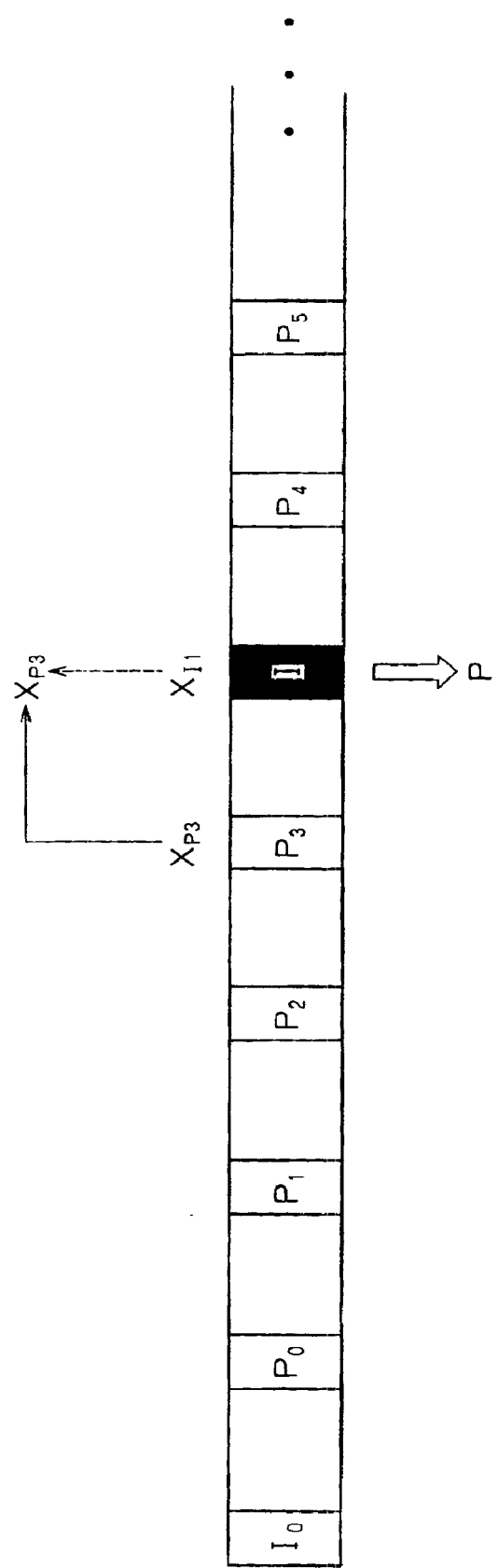
FIG. 9 is a diagrammatic view illustrating a manner wherein the image information conversion apparatus of FIG. 8 converts an I picture of an inputted MPEG2 bit stream into a P-VOP of an MPEG4 bit stream to be outputted

A series of operations of the scene change detection section 21 and the GOV structure determination section 22 is illustrated in FIG. 4.

Referring to FIG. 4, in step S11, the MPEG2 image information decoding section 13 extracts the average quantization scale Q and the allocated code amount (bit number) B of each frame in a GOP.

In step S12, the complexity X of each frame is calculated by operation of the product of the average quantization scale Q and the allocated code amount (bit number) B.

In step S13, the MPEG2 image information decoding section 13 discriminates whether or not the absolute value of the difference when it subtracts, from the complexity $X_{I1}$ of the I picture $I_1$ of the inputted MPEG2 bit stream, the complexity $X_{I0}$ of the immediately preceding I picture $I_0$ of the MPEG2 bit stream is higher than the predetermined threshold value TH.

If the absolute value of the difference is equal to or lower than the predetermined threshold value TH, then the GOV structure determination section 22 performs conversion from the I picture $I_1$ into a P-VOP in step S14.

However, if the absolute value of the difference is higher than the predetermined threshold value TH, then the GOV structure determination section 22 does not perform conversion from the I picture $I_1$ into a P-VOP in step S15.

Accordingly, as described in detail above, when a scene change is detected by the scene change detection section 21, the GOV structure determination section 22 does not perform conversion of an I picture of an inputted MPEG2 bit stream into a P-VOP of an MPEG4 bit stream which corresponds to a P picture. Consequently, picture quality deterioration which occurs upon conversion from an I picture into a P-VOP can be prevented.

The manner of detection of a scene change is not limited to the method which uses the complexity X as in the expression (48). A scene change may otherwise be detected that a scene change is included, for example, in the I picture $I_1$ when, where average values of pixel values of the I pictures $I_0$ and $I_1$ illustrated in FIG. 3 are represented by Mean_$I_0$ and Mean_$I_1$, respectively, the absolute value of the difference between the average values Mean_$I_0$ and Mean_$I_1$ is higher than a threshold value TH determined in advance therefor.

In short, presence/absence of a scene change may be detected depending upon whether or not the following expression (49) is satisfied:

$$|\text{Mean}\_I_1-\text{Mean}\_I_0|>TH \qquad (49)$$

Here, the values Mean_$I_0$ and Mean_$I_1$ may not only be average values of all pixel values but otherwise be average values of DC components of macro blocks as a predetermined coding unit over entire frames, average values of the brightness signal component among pixels, or average values of the brightness signal component among pixels and average values of the color difference signal component among pixels.

Further, while the image information conversion apparatus 1 described above receives an MPEG2 bit stream as an input thereto and outputs an MPEG4 bit stream, the input to and the output from the image information conversion apparatus 1 are not limited to the specific bit streams, and bit streams of, for example, the MPEG1 or the H.263 may be used instead.

While a preferred embodiment of the present invention has been described using specific terms, such description is for illustrative purposes only, and it is to be understood that changes and variations may be made without departing from the spirit or scope of the following claims.

The entire disclosure of Japanese Patent Application No. 2000-344491 filed on Nov. 10, 2000 including specification, claims, drawings and summary is incorporated herein by reference in its entity.

What is claimed is:

1. An image information conversion apparatus comprising:

conversion means for converting first image compression information inputted to said image information conversion apparatus into second image compression information to be outputted from said image information conversion apparatus; each of the first image compression information and the second image compression information including at least intra-image coded pictures and inter-image predictive coded pictures; and scene change detection means operable when said conversion means calculates, based on a variable representative of a complexity of a screen for each frame of the inputted first image compression information, a target code amount for each frame of the second image compression information to be outputted for detecting, prior to conversion of an intra-image coded picture of the first image compression information into an inter-image predictive coded picture of the second image compression information, whether or not a scene change is included in a frame of the intra-image coded picture to be converted, wherein, when said scene change detection means detects that a scene change is included in the frame to be converted, said scene change detection means limits the conversion by said conversion means from the intra-image coded picture of the first image compression information into an inter-image predictive coded picture of the second image compression information, wherein said scene change detection means uses the product of a code amount allocated to each frame and an average quantization scale of the first image compression information as the variable representative of the complexity of the screen for the frame to detect whether or not a scene change is included in the frame, and wherein said scene change detection means subtracts, from the variable representative of the complexity of the screen of the intra-image coded picture of the inputted first image compression information, the variable representative of the complexity of the screen of the immediately preceding intra-image coded picture and determines that a scene change is included when the absolute value of the difference obtained by the subtraction is higher than a threshold value determined in advance.

2. An image information conversion apparatus comprising:

conversion means for converting first image compression information inputted to said image information conversion apparatus into second image compression information to be outputted from said image information conversion apparatus; each of the first image compression information and the second image compression information including at least intra-image coded pictures and inter-image predictive coded pictures; and scene change detection means operable when said conversion means calculates, based on a variable representative of a complexity of a screen for each frame of the inputted first image compression information, a target code amount for each frame of the second image compression information to be outputted for detecting, prior to conversion of an intra-image coded picture of the first image compression information into an inter-image predictive coded picture of the second image compression information, whether or not a scene change is included in a frame of the intra-image coded picture to be converted, wherein, when said scene change detection means detects that a scene change is included in the frame to be converted, said scene change detection means limits the conversion by said conversion means from the intra-image coded picture of the first image compression information into an inter-image predictive coded picture of the second image compression information, wherein said scene change detection means uses the product of a code amount allocated to each frame and an average quantization scale of the first image compression information as the variable representative of the complexity of the screen for the frame to detect whether or not a scene change is included in the frame, and wherein the code amount allocated to each frame of the inputted first image compression information is an entire code amount allocated to the frame.

3. An image information conversion apparatus comprising:

conversion means for converting first image compression information inputted to said image information conversion apparatus into second image compression information to be outputted from said image information conversion apparatus; each of the first image compression information and the second image compression information including at least intra-image coded pictures and inter-image predictive coded pictures; and scene change detection means operable when said conversion means calculates, based on a variable representative of a complexity of a screen for each frame of the inputted first image compression information, a target code amount for each frame of the second image compression information to be outputted for detecting, prior to conversion of an intra-image coded picture of the first image compression information into an inter-image predictive coded picture of the second image compression information, whether or not a scene change is included in a frame of the intra-image coded picture to be converted, wherein, when said scene change detection means detects that a scene change is included in the frame to be converted, said scene change detection means limits the conversion by said conversion means from the intra-image coded picture of the first image compression information into an inter-image predictive coded picture of the second image compression information, wherein said scene change detection means uses the product of a code amount allocated to each frame and an average quantization scale of the first image compression information as the variable representative of the complexity of the screen for the frame to detect whether or not a scene change is included in the frame, and wherein the code amount allocated to each frame of the inputted first image compression information includes a code amount at least of a brightness signal component.

4. An image information conversion apparatus according to claim 3, wherein the code amount allocated to each frame of the inputted first image compression information includes a code amount regarding a brightness signal component and a code amount regarding a color difference signal component.

5. An image information conversion apparatus comprising:

conversion means for converting first image compression information inputted to said image information conversion apparatus into second image compression information to be outputted from said image information conversion apparatus; each of the first image compression information and the second image compression information including at least intra-image coded pictures and inter-image predictive coded pictures; and scene change detection means operable when said conversion means calculates, based on a variable representative of a complexity of a screen for each frame of the inputted first image compression information, a target code amount for each frame of the second image compression information to be outputted for detecting, prior to conversion of an intra-image coded picture of the first image compression information into an inter-image predictive coded picture of the second image compression information, whether or not a scene change is included in a frame of the intra-image coded picture to be converted, wherein, when said scene change detection means detects that a scene change is included in the frame to be converted, said scene change detection means limits the conversion by said conversion means from the intra-image coded picture of the first image compression information into an inter-image predictive coded picture of the second image compression information, and wherein said scene change detection means detects whether or not a scene change is included in the frame to be converted using an average value among pixel values of each frame.

6. An image information conversion apparatus according to claim 5, wherein said scene change detection means subtracts, from the average value among the pixels of the intra-image coded picture, the average value among the pixels of the immediately preceding intra-image coded picture and determines that a scene change is included when the absolute value of the difference obtained by the subtraction is higher than a threshold value determined in advance.

7. An image information conversion apparatus according to claim 5, wherein the average value of the intra-image coded picture among the pixels includes an average value at least of a brightness signal component among the pixels.

8. An image information conversion apparatus according to claim 7, wherein the average value of pixels of the intra-image coded picture includes an average value of the brightness signal component among the pixels and an average value of a color difference signal component among the pixels.

9. An image information conversion apparatus comprising:
   conversion means for converting first image compression information inputted to said image information conversion apparatus into second image compression information to be outputted from said image information conversion apparatus; each of the first image compression information and the second image compression information including at least intra-image coded pictures and inter-image predictive coded pictures; and
   scene change detection means operable when said conversion means calculates, based on a variable representative of a complexity of a screen for each frame of the inputted first image compression information, a target code amount for each frame of the second image compression information to be outputted for detecting, prior to conversion of an intra-image coded picture of the first image compression information into an inter-image predictive coded picture of the second image compression information, whether or not a scene change is included in a frame of the intra-image coded picture to be converted,
   wherein, when said scene change detection means detects that a scene change is included in the frame to be converted, said scene change detection means limits the conversion by said conversion means from the intra-image coded picture of the first image compression information into an inter-image predictive coded picture of the second image compression information, and
   wherein said scene change detection means detects whether or not a scene change is included in the frame to be converted using an average value of a DC component among predetermined coding units included in each frame.

10. An image information conversion apparatus according to claim 9, wherein said scene change detection means subtracts, from the average value of the DC component among the predetermined coding units of the intra-image coded picture, the average value of the DC component among the predetermined coding units of the immediately preceding intra-image coded picture and determines that a scene change is included when the absolute value of the difference obtained by the subtraction is higher than a threshold value determined in advance.

11. An image information conversion apparatus according to claim 9, wherein the average value of the DC component among the predetermined coding units of the intra-image coded picture includes an average value of the DC component at least of a brightness signal component among the predetermined coding units.

12. An image information conversion apparatus according to claim 11, wherein the average value of the DC component among the predetermined coding units of the intra-image coded picture includes an average value of the DC component of a brightness signal component among the predetermined coding units and an average value of the DC component of a color difference signal component among the predetermined coding units.

13. An image information conversion method comprising the steps of:
   converting inputted first image compression information into second image compression information to be outputted, each of the first image compression information and the second image compression information including at least intra-image coded pictures and inter-image predictive coded pictures; and
   detecting, when to calculate, based on a variable representative of a complexity of a screen for each frame of the inputted first image compression information, a target code amount for each frame of the second image compression information to be outputted, prior to conversion of an intra-image coded picture of the first image compression information into an inter-image predictive coded picture of the second image compression information, whether or not a scene change is included in a frame of the intra-image coded picture to be converted,
   wherein, when it is detected that a scene change is included in the frame to be converted, the conversion from the intra-image coded picture into an inter-image predictive coded picture is limited,
   wherein the product of a code amount allocated to each frame and an average quantization scale of the first image compression information is used as the variable representative of the complexity of the screen for the frame to detect whether or not a scene change is included in the frame,
   wherein the variable representative of the complexity of the screen of the immediately preceding intra-image coded picture is subtracted from the variable representative of the complexity of the screen of the intra-image coded picture of the inputted first image compression information, and it is determined that a scene change is included when the absolute value of the difference obtained by the subtraction is higher than a threshold value determined in advance.

14. An image information conversion method comprising the steps of:
   converting inputted first image compression information into second image compression information to be outputted, each of the first image compression information and the second image compression information including at least intra-image coded pictures and inter-image predictive coded pictures; and
   detecting, when to calculate, based on a variable representative of a complexity of a screen for each frame of the inputted first image compression information, a target code amount for each frame of the second image compression information to be outputted, prior to conversion of an intra-image coded picture of the first image compression information into an inter-image predictive coded picture of the second image compression information, whether or not a scene change is included in a frame of the intra-image coded picture to be converted, wherein, when it is detected that a scene change is included in the frame to be converted, the conversion from the intra-image coded picture into an inter-image predictive coded picture is limited, wherein the product of a code amount allocated to each frame and an average quantization scale of the first image compression information is used as the variable representative of the complexity of the screen for the frame to detect whether or not a scene change is included in the frame, wherein the code amount allocated to each frame of the inputted first image compression information is an entire code amount allocated to the frame.

15. An image information conversion method comprising the steps of:

converting inputted first image compression information into second image compression information to be outputted, each of the first image compression information and the second image compression information including at least intra-image coded pictures and inter-image predictive coded pictures; and detecting, when to calculate, based on a variable representative of a complexity of a screen for each frame of the inputted first image compression information, a target code amount for each frame of the second image compression information to be outputted, prior to conversion of an intra-image coded picture of the first image compression information into an inter-image predictive coded picture of the second image compression information, whether or not a scene change is included in a frame of the intra-image coded picture to be converted, wherein, when it is detected that a scene change is included in the frame to be converted, the conversion from the intra-image coded picture into an inter-image predictive coded picture is limited, wherein the product of a code amount allocated to each frame and an average quantization scale of the first image compression information is used as the variable representative of the complexity of the screen for the frame to detect whether or not a scene change is included in the frame, wherein the code amount allocated to each frame of the inputted first image compression information includes a code amount at least of a brightness signal component.

16. An image information conversion method according to claim 15, wherein the code amount allocated to each frame of the inputted first image compression information includes a code amount regarding a brightness signal component and a code amount regarding a color difference signal component.

17. An image information conversion apparatus comprising:

conversion means for converting first image compression information inputted to said image information conversion apparatus into second image compression information to be outputted from said image information conversion apparatus; each of the first image compression information and the second image compression information including at least intra-image coded pictures and inter-image predictive coded pictures; and scene change detection means operable when said conversion means calculates, based on a variable representative of a complexity of a screen for each frame of the inputted first image compression information, a target code amount for each frame of the second image compression information to be outputted for detecting, prior to conversion of an intra-image coded picture of the first image compression information into an inter-image predictive coded picture of the second image compression information, whether or not a scene change is included in a frame of the intra-image coded picture to be converted, wherein, when said scene change detection means detects that a scene change is included in the frame to be converted, said scene change detection means limits the conversion by said conversion means from the intra-image coded picture of the first image compression information into an inter-image predictive coded picture of the second image compression information, and wherein it is detected whether or not a scene change is included in the frame to be converted using an average value among pixel values of each frame.

18. An image information conversion method according to claim 17, wherein the average value among the pixels of the immediately preceding intra-image coded picture is subtracted from the average value among the pixels of the intra-image coded picture, and it is determined that a scene change is included when the absolute value of the difference obtained by the subtraction is higher than a threshold value determined in advance.

19. An image information conversion method according to claim 17, wherein the average value of the intra-image coded picture among the pixels includes an average value at least of a brightness signal component among the pixels.

20. An image information conversion method according to claim 19, wherein the average value of pixels of the intra-image coded picture includes an average value of the brightness signal component among the pixels and an average value of a color difference signal component among the pixels.

21. An image information conversion apparatus comprising:

conversion means for converting first image compression information inputted to said image information conversion apparatus into second image compression information to be outputted from said image information conversion apparatus; each of the first image compression information and the second image compression information including at least intra-image coded pictures and inter-image predictive coded pictures; and scene change detection means operable when said conversion means calculates, based on a variable representative of a complexity of a screen for each frame of the inputted first image compression information, a target code amount for each frame of the second image compression information to be outputted for detecting, prior to conversion of an intra-image coded picture of the first image compression information into an inter-image predictive coded picture of the second image compression information, whether or not a scene change is included in a frame of the intra-image coded picture to be converted, wherein, when said scene change detection means detects that a scene change is included in the frame to be converted, said scene change detection means limits the conversion by said conversion means from the intra-image coded picture of the first image compression information into an inter-image predictive coded picture of the second image compression information, and wherein it is detected whether or not a scene change is included in the frame to be converted using an average value of a DC component among predetermined coding units included in each frame.

22. An image information conversion method according to claim 21, wherein the average value of the DC component among the predetermined coding units of the immediately preceding intra-image coded picture is subtracted from the average value of the DC component among the predetermined coding units of the intra-image coded picture, and it is determined that a scene change is included when the absolute value of the difference obtained by the subtraction is higher than a threshold value determined in advance.

23. An image information conversion method according to claim 21, wherein the average value of the DC component among the predetermined coding units of the intra-image coded picture includes an average value of the DC component at least of a brightness signal component among the predetermined coding units.

24. An image information conversion method according to claim 23, wherein the average value of the DC component among the predetermined coding units of the intra-image coded picture includes an average value of the DC component of a brightness signal component among the predetermined coding units and an average value of the DC component of a color difference signal component among the predetermined coding units.

* * * * *